United States Patent [19]

Iida et al.

[11] 4,103,664
[45] Aug. 1, 1978

[54] COMBUSTION CHAMBER FOR COMPACT ENGINE OF THE SIDE VALVE TYPE FOR UNIVERSAL USE HAVING CONTACTLESS IGNITION SYSTEM

[75] Inventors: Kiyonobu Iida; Yoshio Tani; Kouichi Sugahara, all of Sakai, Japan

[73] Assignee: Kubota, Ltd., Osaka, Japan

[21] Appl. No.: 725,187

[22] Filed: Sep. 21, 1976

[51] Int. Cl.² .............................................. F02B 23/00
[52] U.S. Cl. .......................... 123/191 L; 123/148 CC; 123/191 R
[58] Field of Search .......... 123/32 C, 32 SP, 148 CC, 123/188 S, 191 R, 191 L, 191 S, 193 R, 193 CH, 193 H

[56] References Cited

U.S. PATENT DOCUMENTS

| Re. 20,670 | 3/1938 | Bocz | 123/191 L |
|---|---|---|---|
| 1,474,003 | 11/1923 | Ricardo | 123/191 L |
| 1,476,264 | 12/1923 | Matthews | 123/193 R |
| 1,743,276 | 1/1930 | Kreis | 123/191 L |
| 1,793,186 | 2/1931 | Moorhouse | 123/191 L |
| 1,902,831 | 3/1933 | Burke | 123/191 L |
| 2,010,028 | 8/1935 | Martin | 123/191 L |
| 2,705,943 | 4/1955 | Benes | 123/191 L |
| 2,737,940 | 3/1956 | Kinney | 123/191 L |
| 3,612,023 | 10/1971 | Sohner | 123/148 CC |
| 3,693,606 | 9/1972 | Hardenberg | 123/188 S |

FOREIGN PATENT DOCUMENTS 637,227  4/1928  France ................. 123/191 L

Primary Examiner—Ronald H. Lazarus
Attorney, Agent, or Firm—Armstrong, Nikaido, Marmelstein & Kubovcik

[57] ABSTRACT

The spark gap portion of an ignition plug in a combustion chamber is adapted to be opposed to a bundle of streams of the air-fuel mixture withdrawn from an intake valve and is positioned on a line extending from the center of the cylinder to a midpoint between the intake valve and an exhaust valve, the spark gap portion further being positioned approximately midway between the center and the midpoint. The spark gap portion of the plug and the vicinity thereof are automatically cleaned at every stroke of the piston.

6 Claims, 6 Drawing Figures

COMBUSTION CHAMBER FOR COMPACT ENGINE OF THE SIDE VALVE TYPE FOR UNIVERSAL USE HAVING CONTACTLESS IGNITION SYSTEM

BACKGROUND OF THE INVENTION

This invention relates to improvements in the combustion chamber of compact engines of the side valve type for universal use incorporating a contactless ignition system having outstanding firing performance.

It is well known that ignition systems presently used in gasoline engines include a magneto of the contact type by which the high voltage obtained by electromagnetic induction is applied to an ignition plug for spark discharge to fire an air-fuel mixture. In recent years, however, attention has been directed to ignition systems of the contactless type, and more particularly to the capacitor discharge ignition system (hereinafter referred to as "CDI system"). In fact there is a growing tendency to employ the CDI system.

The CDI system is operable free of the drawbacks of the contact-type magneto, especially the troubles due to staining of the contact points. Since the system does not involve arcing which occurs across the points of a contact-type magneto, the system gives substantially constant secondary voltage for low-speed to high-speed operation, exhibits outstanding starting and low-speed performance without mis-sparking and is serviceable almost permanently free of point failures because the system is of the contactless type in which electronic signal causes sparking. Because the system does not include the points and lifter which are required for contact-type magneto and which are subject to abrasion, the system assures accurate ignition timing at all times and therefore retains good performance for a prolonged period of time.

The CDI system has another advantage that the high primary voltage permits the secondary voltage to build up quickly, consequently firing the ignition plug with a large spark without any failure.

Despite the various advantages described above, the CDI system remains yet to be improved for use in compact engines of the side valve type as will be described below. Because of the characteristics of the CDI system, the sparking time (50 to 100 microseconds) is 1/20 to 1/10 of that of the contact-type magneto, thus failing to satisfactorily establish steady combustion in conventional side valve type compact engines. The system is not properly adapted for combustion chambers designed for the conventional contact-type magneto. In fact when the system is incorporated into compact engines of the side valve type, misfiring frequently occurs especially during no-load running, producing irregular combustion noises and giving discomfort to the operator. These drawbacks may be overcome by prolonging the sparking time of the ignition plug, but this renders the system large-sized and expensive, with the result that it becomes difficult to install the system in compact engines in view of the limited space available for installation and cost.

SUMMARY OF THE INVENTION

An object of this invention is to provide a combustion chamber for compact engines of the side valve type for universal use, the combustion chamber being adapted for a compact, inexpensive CDI system.

Another object of this invention is to provide a combustion chamber for compact engines of the type described and equipped with a CDI system, the combustion chamber being so designed that the spark gap portion of the ignition plug exposed to the interior of the combustion chamber is kept clean at all times to ensure reliable ignition without misfiring.

Another object of this invention is to provide a combustion chamber permitting the ignition plug to operate free of smoldering so that the plug can be fired reliably over a prolonged period of time.

Still another object of this invention is to provide a combustion chamber permitting reliable firing of the ignition plug without failure so as to reduce unburned hydrocarbon emissions and to thereby control pollution.

The above and other objects and novel features of this invention will become more apparent from the following detailed description with reference to the accompanying drawings, which are given for illustrative purposes only and are not in any way limitative.

DETAILED DESCRIPTION OF THE INVENTION

Figure 1:
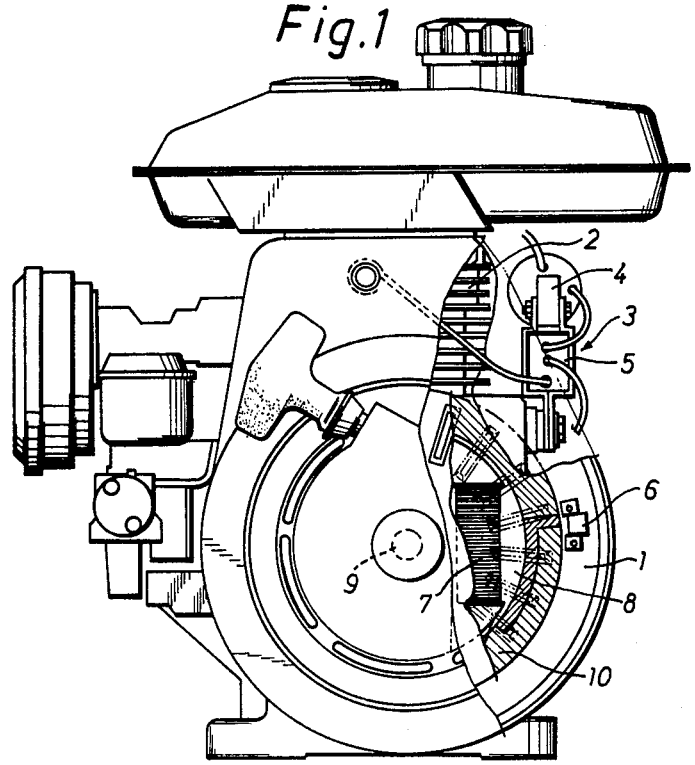
FIG. 1 is a front view partly broken away to show the appearance of a compact engine of the side valve type for universal use which includes a combustion chamber of this invention and a CDI system.
Figure 2:
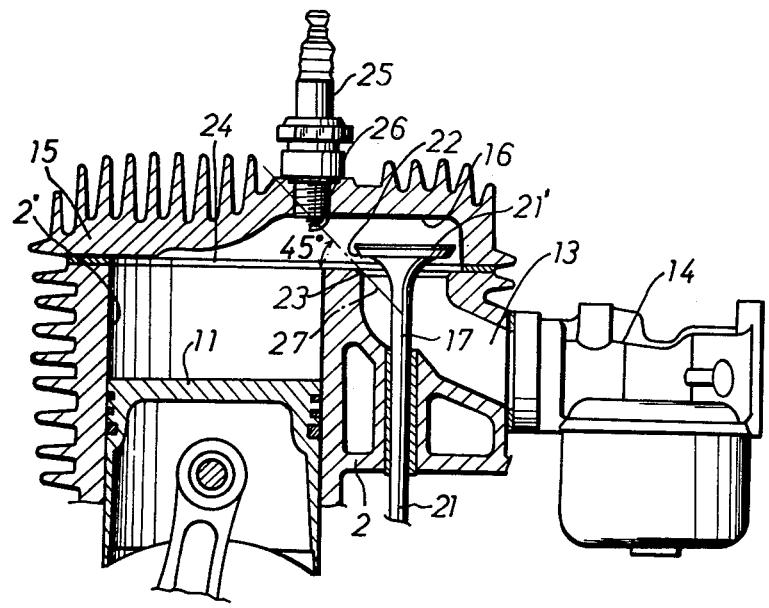
FIG. 2 is a view in vertical section showing the combustion chamber embodying this invention.
Figure 3:
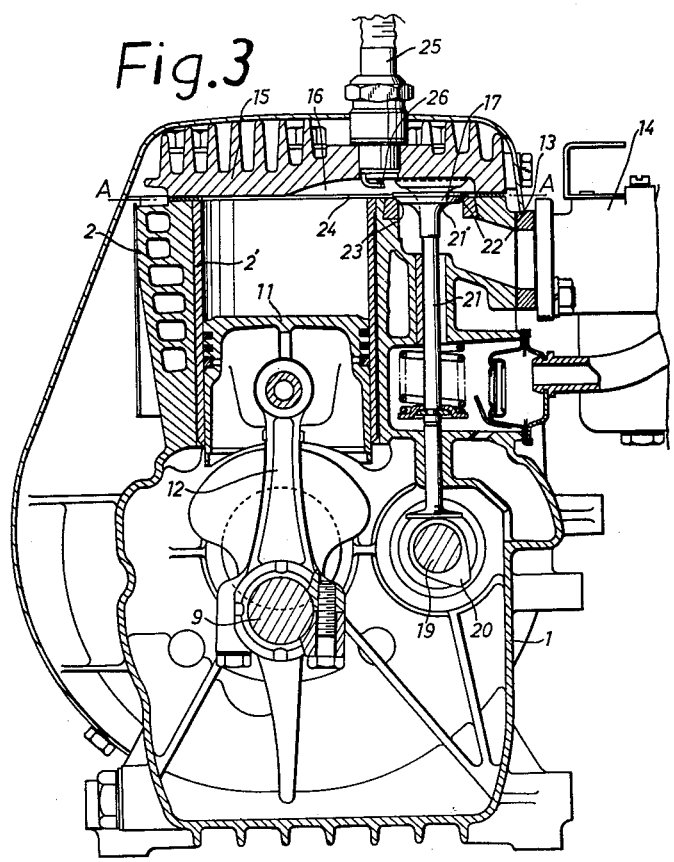
FIG. 3 is an enlarged view in vertical section showing the engine in its entirety, the engine including the combustion chamber of this invention.

FIG. 1 shows a crank case 1, a cylinder main body 2 and a CDI system 3 mounted on a boss of the crank case 1 and located at a position which is free of thermal influence to the greatest possible extent. The CDI system 3 comprises an ignition coil 4 and a CDI unit 5, i.e. a unit of electronic elements for controlling ignition timing. The unit 5 includes a charging diode, capacitor, SCR, etc. which are enclosed in a block of insulating synthetic resin. FIG. 1 further shows a timing coil 6, a capacitor charging coil 7 and a magnetic steel member 8 provided on the annular inner peripheral surface of a flywheel fan 10 fixedly mounted on the end of a crank shaft 9. These elements are interconnected by lead wires. With reference to FIGS. 2 and 3, a piston 11 reciprocally movable within the cylinder 2' of the cylinder main body 2 is connected to the crank shaft 9 by a rod 12. An intake port 13 provided in the vicinity of the cylinder 2' communicates with a carburetor 14. A cylinder head 15, mounted on and covering the top of the cylinder main body 2, is caved in to provide a combustion chamber 16 opposed to the piston 11. An intake valve 17 and an exhaust valve 18, provided on one side portion of the cylinder 2', are arranged side by side and are openable by a cam 20 on a cam shaft 19.

The intake valve 17 has a valve stem 21 extending in parallel to the axis of the cylinder 2'. The stem has a head 21' provided with a tapered valve disk 22 having a tapered edge defined by its slanting peripheral bottom surface. The disk 22 is fittable to a tapered valve seat 23 formed at the opening of the intake port 13 adapted for communication with the combustion chamber to open and close the port 13. The angle of the taper of each of the valve disk 22 and the valve seat 23 is usually 40° to 50°, preferably 45°. In other words, the angle between each of the tapered portions and the interface 24 between the cylinder main body 2 and the cylinder head 15 is 40° to 50°.

Figure 4:
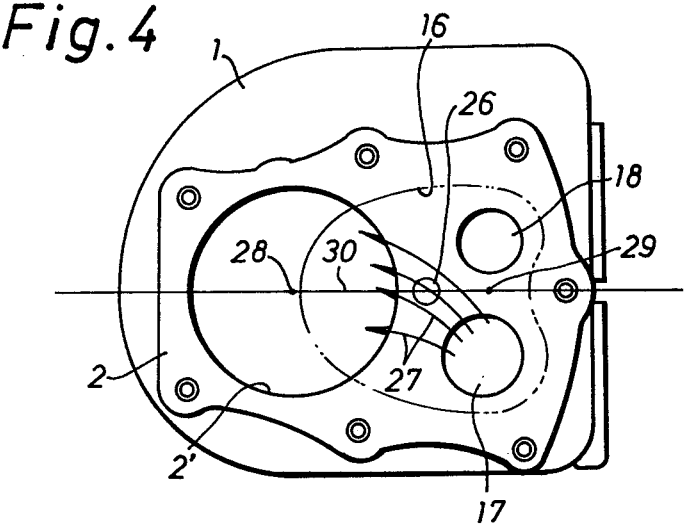
FIGS. 4 and 5 are views taken along the line A—A in FIG. 3 and illustrating the operation of the combustion chamber, FIG. 4 showing the chamber during intake operation, FIG. 5 showing the same during compression.
Figure 5:
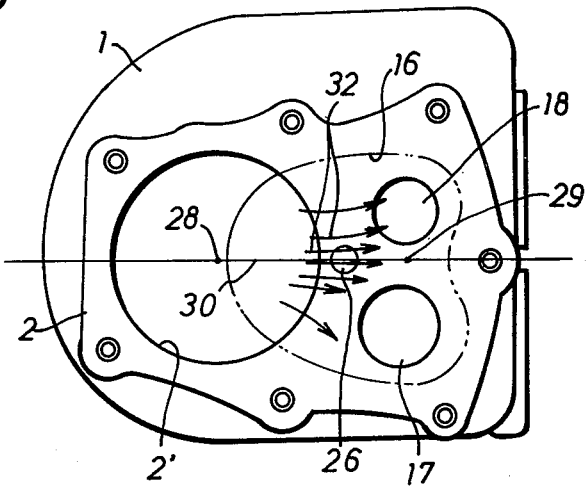

With reference to FIGS. 4 and 5, the contour of the combustion chamber 16 surrounds the intake valve 17 and the exhaust valve 18 and resembles that of a tongue. The apex A of the combustion chamber 16 overlaps about $\frac{1}{3}$ to $\frac{2}{3}$, preferably about $\frac{1}{2}$, the inside diameter of the cylinder 2' taken along a line interconnecting the center 28 to the cylinder 2' and the point 29.

An ignition plug 25 is screwed into the cylinder head 15 in the usual manner, with its spark gap portion 26 exposed to the interior of the combustion chamber 16. The spark gap portion 26 is adapted to be opposed to a bundle of streams 27 of an air-fuel mixture withdrawn through the intake valve 17 and is positioned on a line 30 extending from the center 28 of the cylinder 2' to a midpoint 29 between the intake valve 17 and the exhaust valve 18, the spark gap portion 26 further being positioned approximately at the midpoint between the center 28 and the midpoint 29.

The embodiment of this invention having the foregoing construction operates in the following manner. During the intake stroke of the piston 11, an air-fuel mixture is withdrawn from the intake valve 17 in its open position through the clearance between the disk 22 of the intake valve 17 and the seat 23 thereof into the combustion chamber 16, the mixture being so introduced in the form of a bundle of streams 27 which is substantially two dimensional but having a thickness defined by the opposed tapered portions of the disk 22 and the seat 23. Since the spark gap portion 26 of the ignition plug 25 is so positioned as to be opposed to the bundle of streams 27 and is also positioned approximately midway between the center 28 of the cylinder 2' and the midpoint 29 on the line 30, the spark gap portion 26 is cleaned with the bundle of fresh streams 27 which forces away the residual gas resulting from the previous cycle of combustion. Thus the residual gas is not allowed to remain in the vicinity of the spark gap portion 26. Further during the compression portion of the engine cycle as shown in FIG. 5, the compressed air-fuel mixture is in such state that the main stream 32 of the mixture having a relatively high concentration is directed as indicated by the arrows on and along the line 30 extending from the center 28 of the cylinder 2' to the midpoint 29 between the edge of valves 17 and 18. Since the spark gap portion 26 of the ignition plug 25 is positioned on the line 30 approximately midway between the points 28 and 29, the mixture can be reliably fired and the resulting fire is readily spreadable on ignition. Thus good combustion efficiency is attainable without misfiring during no-load running. When the sparking time is short, the possibility of firing reduces, permitting a large amount of residual gas to remain in the vicinity of the spark gap portion 26 and consequently leading to inevitable misfiring, whereas the cleaning action effected by the bundle of streams 27 flowing from the intake valve to the spark gap portion 26 assures firing without failure.

Figure 6:
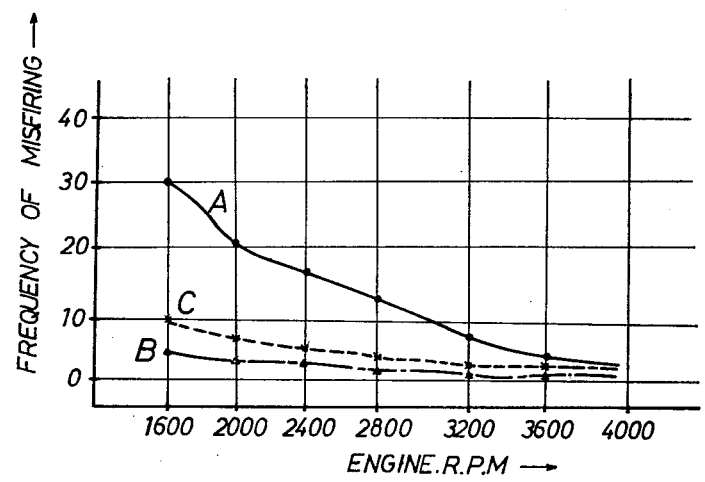
FIG. 6 is a graph showing the frequency of misfiring occurring in the combustion chamber of this invention during no-load running in comparison with those of other combustion chambers.

FIG. 6 is a graph showing a comparison between the combustion chamber of this invention and other combustion chambers in respect of frequency of misfiring. In the graph, the number of revolutions of the engine is plotted as abscissa vs. the frequency of misfiring as ordinate. The test was conducted with use of the same engine.

In the graph, A and B represent the results of comparison examples, and C those of the combustion chamber of this invention. With the comparison example A, the combustion chamber was equipped with the same CDI system (sparking time: 100 microseconds) as the invention C, and the ignition plug was positioned closer toward the intake and exhaust valves than the ignition plug of the invention, as deviated from the position where the plug of the invention is opposed to a bundle of streams of air-fuel mixture. The comparison example B was equipped with a greater CDI system (sparking time: 500 microseconds).

The test results shown in FIG. 6 indicate that during no-load, low-speed running the combustion chamber C of this invention involves a greatly reduced frequency of misfiring as compared with the comparison example A, exhibiting almost the same performance as the comparison example B.

As described above, the combustion chamber provided by this invention for use in compact engines of the side valve type equipped with a compact inexpensive CDI system is so adapted that the vicinity of the spark gap portion of the ignition plug exposed to the chamber is automatically cleaned at every stroke. Accordingly, the combustion chamber assures a satisfactory engine operation with reliable firing without any failure, renders the ignition plug free of smoldering and serviceable for a prolonged period of time, serves to reduce unburned hydrocarbon emissions which are liable to result from misfiring and is therefore useful in controlling pollution. Thus the invention makes it possible to provide compact engines of the side valve type for universal use in which a compact inexpensive CDI system is installed.

Although this invention has been described in detail with reference to the most preferred embodiment, other variations and modifications may be made without departing from the spirit and scope of this invention. Accordingly the invention as defined in the appended claims is not limited to the specific embodiment described.

What is claimed is:

1. In a combustion chamber for a compact engine of a side valve type having a contactless ignition system said engine comprising a cylinder, an intake valve, an exhaust valve and an ignition plug, the improvement wherein the spark gap portion of the ignition plug is positioned in said combustion chamber on a line extending from the center of the cylinder to the midpoint between the edges of said intake valve and said exhaust valve and midway between the center of said cylinder and said midpoint, and wherein said spark gap is opposed to a bundle of streams of an air fuel mixture drawn into said combustion chamber through said intake valve.

2. A combustion chamber as defined in claim 1 wherein the contactless ignition system is of the capacitor discharge ignition type, and the sparking time of the system is 50 to 100 microseconds.

3. A combustion chamber as defined in claim 2 wherein the head of the cylinder is caved in to provide the combustion chamber in opposed relation to a piston, the combustion chamber having a tongue-like contour surrounding the intake valve and the exhaust valve, the combustion chamber overlapping about ⅓ to ⅔ the inside diameter of the cylinder taken along the line extending from the center thereof to said midpoint.

4. A combustion chamber as defined in claim 3 wherein the bundle of streams of the air-fuel mixture is withdrawn from the intake valve into the combustion chamber at an angle of 40° to 50° with respect to the interface between the cylinder and the head of the cylinder.

5. A combustion chamber as defined in claim 1 wherein the bundle of streams of the air-fuel mixture is withdrawn from the intake valve into the combustion chamber at an angle of 40° to 50° with respect to the interface between the cylinder and the head of the cylinder.

6. A combustion chamber as defined in claim 1 wherein the head of the cylinder is caved in to provide the combustion chamber in opposed relation to a piston, the combustion chamber having a tongue-like contour surrounding the intake valve and the exhaust valve, the combustion chamber overlapping about ⅓ to ⅔ the inside diameter of the cylinder taken along the line extending from the center thereof to said midpoint.

* * * * *